United States Patent [19]

Baker

[11] Patent Number: 4,796,657
[45] Date of Patent: Jan. 10, 1989

[54] ZONE SELECTOR AND LOCKING MECHANISM FOR SEQUENCING VALVE

[76] Inventor: Joseph R. Baker, 73 Fairview East, Tequesta, Fla. 33469

[21] Appl. No.: 189,029

[22] Filed: May 2, 1988

Related U.S. Application Data

[63] Continuation-in-part of Ser. No. 52,267, May 21, 1987, abandoned.

[51] Int. Cl.[4] ............................................. F16K 21/00
[52] U.S. Cl. ................................ 137/119; 137/624.12; 137/624.18
[58] Field of Search ................. 137/119, 624.18, 624.2, 137/624.13, 624.15, 624.12

[56] References Cited

U.S. PATENT DOCUMENTS

| | | | |
|---|---|---|---|
| 3,459,208 | 8/1969 | Clyde | 137/119 |
| 3,524,470 | 8/1970 | Kah | 137/119 X |
| 3,635,237 | 1/1972 | Kah | 137/119 |
| 3,942,652 | 12/1975 | Kah | 137/119 |
| 4,038,290 | 4/1978 | Andres | 137/625.15 X |
| 4,125,124 | 11/1978 | Kah | 137/119 |
| 4,178,963 | 12/1979 | Riefler | 137/624.18 |
| 4,195,665 | 4/1980 | Nolan | 137/124.18 |
| 4,316,480 | 2/1982 | Kah | 137/119 |
| 4,492,247 | 1/1985 | Lockwood | 137/119 |

Primary Examiner—Alan Cohan
Attorney, Agent, or Firm—Alvin S. Blum

[57] ABSTRACT

This invention relates to a sequencing valve for distributing fluid from an inlet selectively to one or more of a plurality of outlets in response to pressure variation in the source fluid. The improvement provides a manual means for advancing the valve mechanism without water pressure to select a particular outlet. The improvement further provides means to inactivate the sequencing mechanism so that the inlet source will remain connected to the selected outlet irrespective of pressure changes in the source fluid.

19 Claims, 7 Drawing Sheets

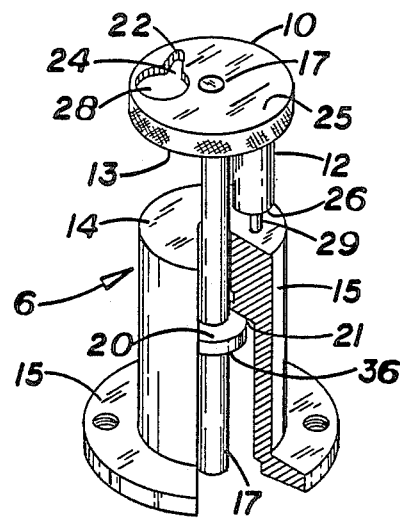
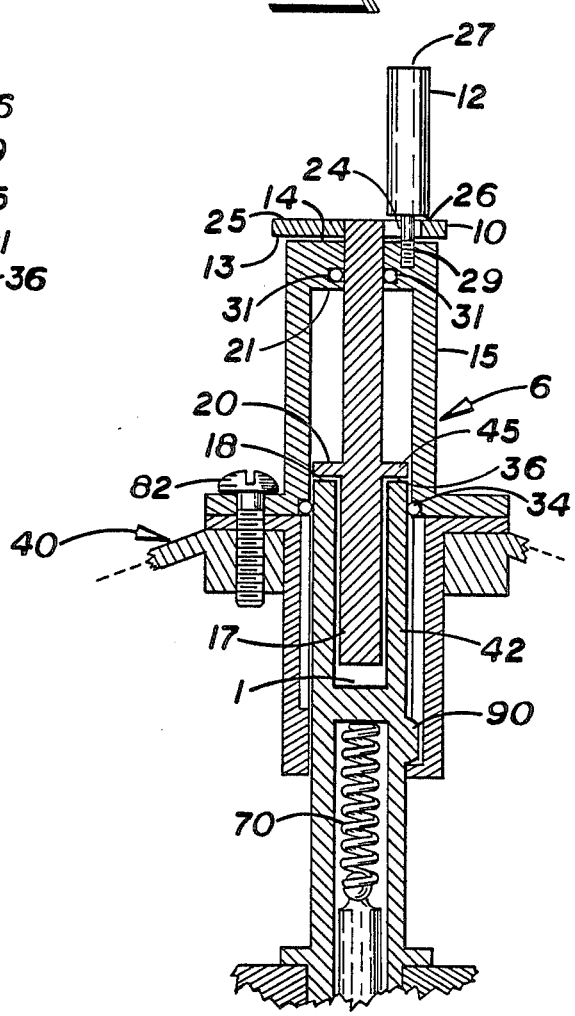
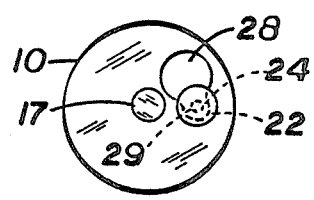

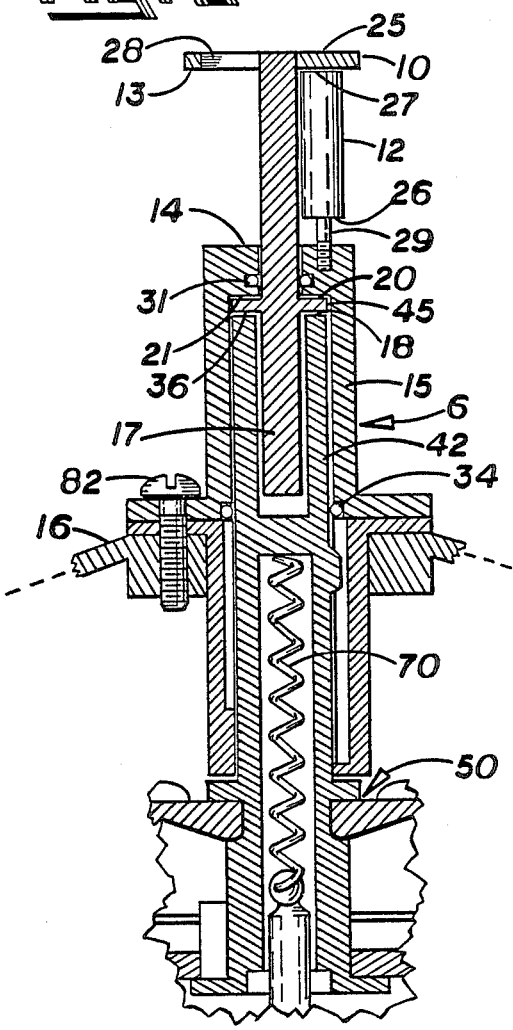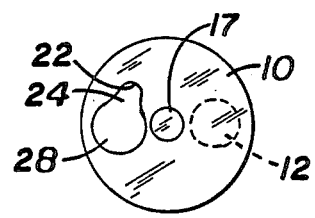

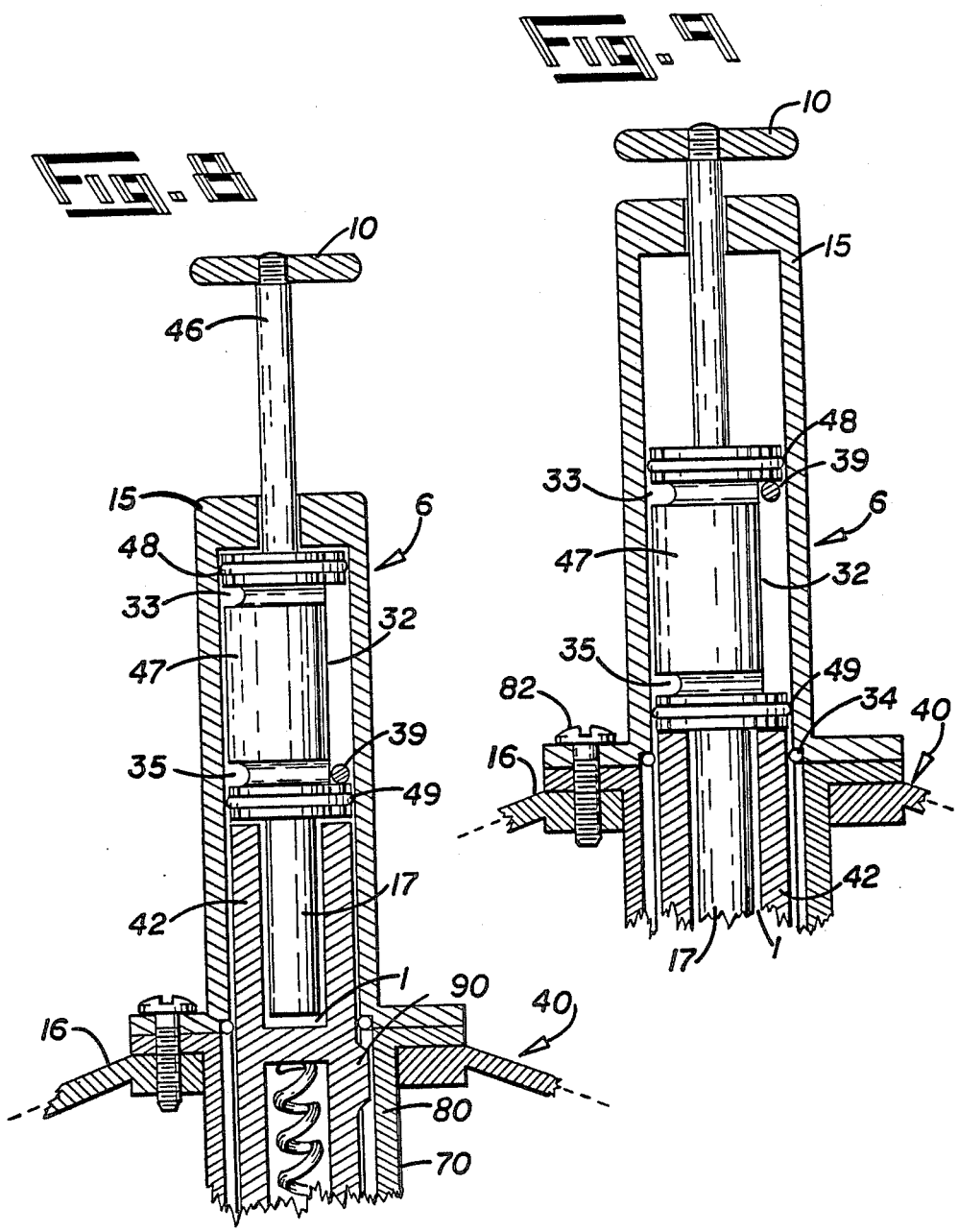

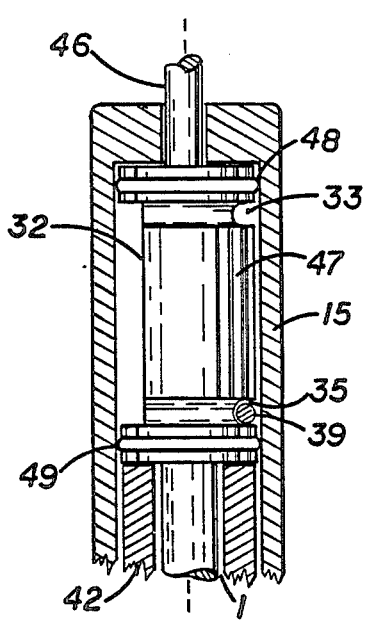
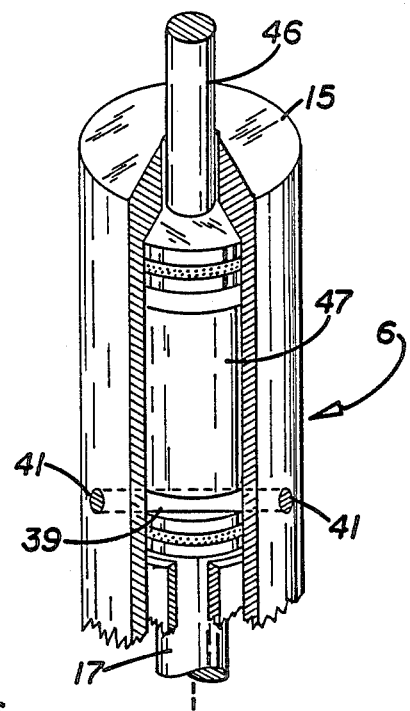
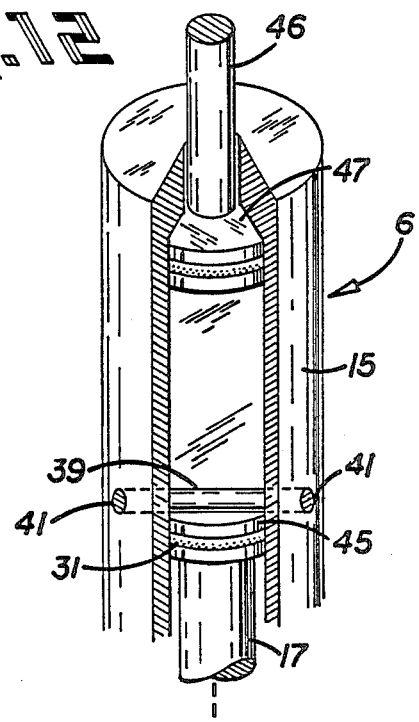

ZONE SELECTOR AND LOCKING MECHANISM FOR SEQUENCING VALVE

This application is a continuation-in-part of application Ser. No. 052,267, filed May 21, 1987, abandoned.

BACKGROUND OF THE INVENTION

This invention relates generally to sequencing valves for sequentially selectively coupling one of a plurality of outlet conduits with a single supply conduit that sequentially actuate in response to a change in fluid pressure and more particularly to an attachment for certain of said valves that provides for manual sequencing and also provides for locking said valve to a selected outlet conduit to prevent sequencing with pressure change.

Valves of this general type that provide neither manual selector nor locking are described in the following U.S. Pat. Nos. 3,524,470; 3,635,237; 3,924,652; 4,125,124; 4,083,290; 4,178,963; 4,195,665 and two that provide for manual selection, but not locking U.S. Pat. No. 3,459,208 to Clyde and U.S. Pat. No. 4,492,247 to Lockwood.

Valves of this type now in general use for lawn watering systems often use a single high presure water line to water a large area in zones. Each zone is fed by a branch water line from the valve. By feeding only one branch line at a time, a water supply line of limited pressure and volume can effectively water the entire area by watering one zone at a time. Such systems generally operate on timer mechanisms that periodically turn the water supply on and off with an electrically controlled valve or pump. The sequencing valves in common use are actuated by a pressure responsive reciprocating piston in the valve's flow path so as to sequence from one zone to the next zone when the water pressure is cut off and then on again. The on/off timing mechanism thereby provides both overall timing of the watering system and also sequencing, thus eliminating separate sequencing control mechanisms.

The valves of Clyde and Lockwood provide a part external to the valve housing that rotates in tandem with the inner valve mechanism. This provides indication of which outlet is selected even with the water supply off. It also provides a means to select an outlet manually with the water supply off, because moving the external device moves the internal selector. Unfortunately, this moving part is exposed to the elements and to trauma from which other parts are shielded by the valve housing. There are situations, especially during maintenance, when it is useful to manually select a particular outlet and also to lock the valve in that position so that it will not sequence when the water supply is turned on and off. However, that conveience should not be negated by exposing the internal valve mechanism to damage from an external moving part.

SUMMARY OF THE INVENTION

It is accordingly an object of the invention to provide an attachment for sequencing fluid valves that will provide for manual sequencing and for locking the valve at a particular outlet so that it will not sequence when the water supply is turned on and off. It is a further object to provide an attachment that will not have any external parts that move with the internal parts of the valve during normal sequencing operation to ensure that the valve mechanism is not exposed to damage by use of the attachment. Sequencing valves to which the attachment may be applied have a piston that is forced upward by spring bias to a first position when water pressure is off. The piston is forced downward to a second position when water pressure is on. Each time the piston goes up and then down, it rotates through a fixed angle. The piston is also the valve element and each downstroke seals off all outlets except a single selected outlet. The top of the piston is accessible through a removable access port cover in the housing. The attachment replaces the access port cover. The attachment includes an outer housing that replaces the access port cover and a manually operable element movable within that housing from a first, upper position to a second, lower position with means to lock said element in either position. When the manually operable element is locked in the first, upper position, the sequencing valve operates normally, and the attachment does not effect the sequencing operation in any way. When the manually operable element is locked in the second, lower position, the piston cannot move upward and the valve will not rotate and the valve will remain at whatever outlet has been selected regardless of the on/off conditions of the water supply, i.e. it is locked and will not sequence. Furthermore, when the manually operable element is moved up and then down with the water supply off, the piston will rotate to the next outlet. By repetitive up and down movement of the element, the user can thereby manually select a particular outlet conduit and zone without use of water pressure.

The construction of the invention in its preferred embodiments and the manner through which the desired results are secured will be best understood by reference to the following detailed description and illustrations, in which:

BRIEF DESCRIPTION OF THE DRAWINGS

FIG. 3 is a perspective view of a first embodiment of the invention.

FIG. 4 is a cross sectional view of the attachment of FIG. 3 in place on a valve with sequencing function locked out.

FIG. 5 is a top view of a portion of FIG. 4.

FIG. 6 is a cross section view as in FIG. 4 with sequencing function operational.

FIG. 7 is a top view of a portion of FIG. 6.

FIG. 8 is a cross section view of an alternative embodiment of the invention in place on a valve with control member up.

FIG. 9 is a view as in FIG. 8 with control member down.

FIG. 10 is a partial detail as in FIG. 8 with control locked in up position.

FIG. 11 is a perspective view of FIG. 10 with a portion cut away.

FIG. 12 is a perspective view of a detail of FIG. 8 with a portion cut away.

PRIOR ART VALVE DESCRIPTION

Figure 1:
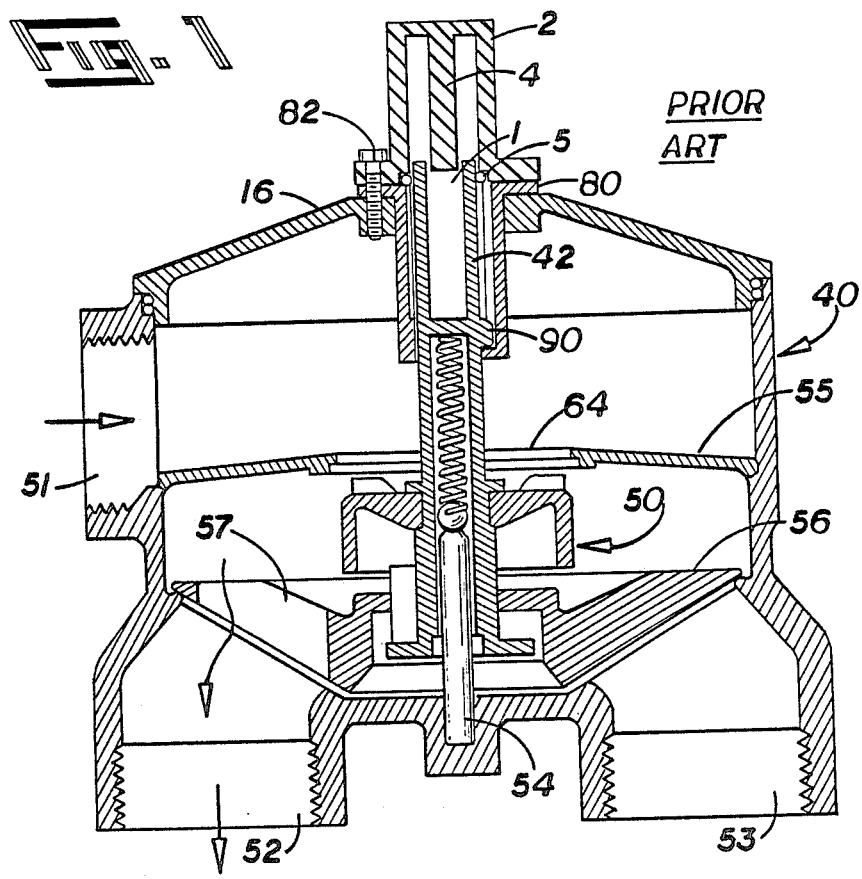
FIG. 1 is a valve of the prior art in cross section with water flowing.
Figure 2:
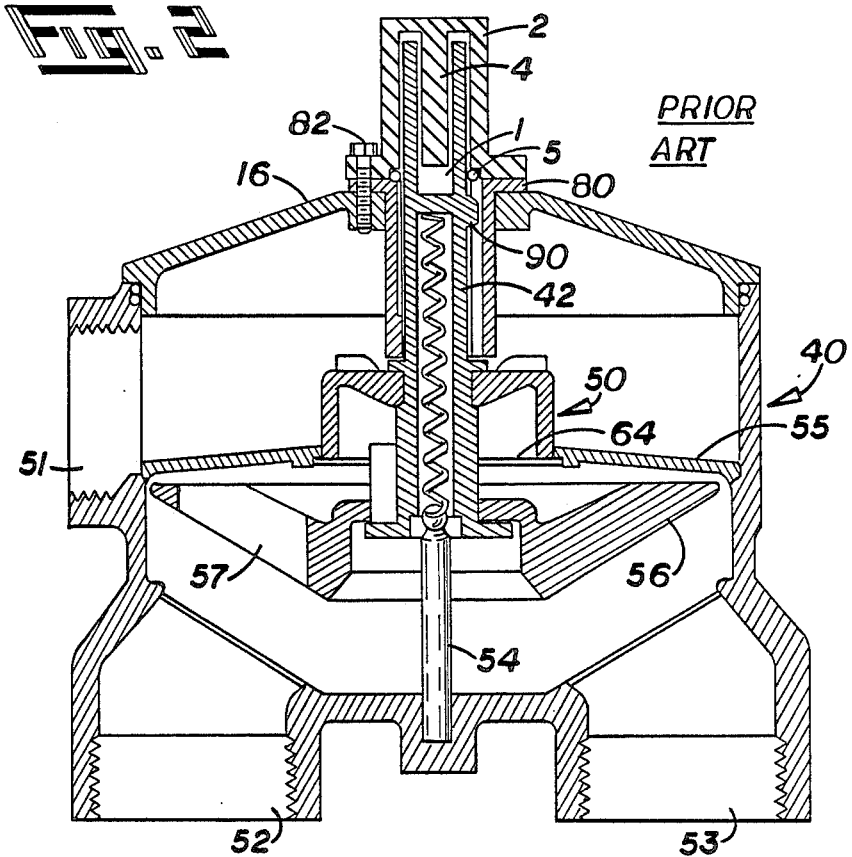
FIG. 2 is the valve of FIG. 1 with water supply off.

Referring now first to FIGS. 1 and 2, a typical sequencing valve 40 of the prior art to which the attachment of the invention is to be applied is illustrated with water flowing condition in FIG. 1 and without water pressure in FIG. 2. A single water inlet port 51 communicates with a plurality of outlet ports 52, 53. A piston assembly 50 with vertical stem 42 rides up and down on rod 54. It is forced upward into position of FIG. 2 by force of spring 70 closing aperture 64 in member 55 and elevating outlet sealing element 56. In the upward position of assembly 50, guide pin 4 of cap 2 fits into pilot hole 1 of vertical stem 42, providing vertical stability to assembly 50. An O-ring 5 seals cap 2 in place, preventing water leakage. Water pressure forces assembly downward to the position of FIG. 1 in which outlet sealing assembly 56 seals all outlets except one through passage 57, in this case outlet 52 is open and all other outlets are sealed, other outlets are not visible in this view. Each up and down cycle of assembly 50 causes cam follower 90 on stem 42 to follow a pattern in camming member 80 that causes assembly 50 to rotate about its vertical axis so that passage 57 in outlet sealing element 56 is moved to the next outlet in the sequence.

DETAILED DESCRIPTION OF PREFERRED EMBODIMENT OF THE INVENTION

Figure 15:
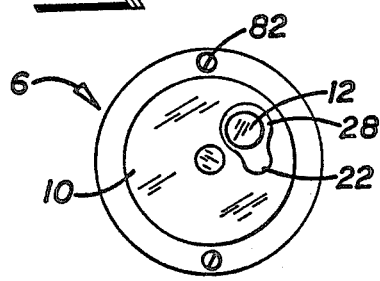
FIG. 15 is a top view of the attachement in free position.

The attachment 6 of the invention is shown in perspective in FIG. 3 with the cap 15 partially cut away to show interior structure. In FIG. 4 and 6 it is shown in operation attached to sequencing valve 40, only a portion of which is shown for convenience of illustration. The cap 2 with guide pin 4 is removed after removing bolts 82. The attachment 6 replaces cap 2 and O-ring seal 31 replaces O-ring seal 5. Bolts 82 hold attachment 6 and camming member 80 to housing 16. Whereas the cap 2 had a fixed guide pin 4, the attachment 6 of the invention provides a movable control member 17 that can be manually raised and lowered between the first, upper position shown in FIG. 6 to a second, lower position shown in FIG. 4. It is also shown in the upper position in FIG. 3. In the upper, inactive position of control member 17, the sequencing valve 40 operates in the usual manner, with the stem member 42 falling and rising as water pressure is applied and removed respectively. The pilot hole 1 in the upper portion of stem member 42 becomes filled by the lower portion of control member 17 serving the same function as the guide pin 4 of the cap 2 of FIGS. 1 and 2, i.e. stabilizing the vertical position of the stem member 42. The control member 17 is held in the upper position shown in FIGS. 3, 6 and 7 by means of the handle 10 resting with its under surface 13 engaging the top surface 27 of lock rod 12. This is the normal operating position. When the water pressure is off, the sequencing valve 40 can be sequenced to the next outlet by rotating the handle 10 from the position shown in FIG. 7 to the free position of FIG. 15, in which the large diameter hole 28 in handle 10 is directly over the lock rod 12 and pushing the handle 10 down all the way and then releasing it. When handle 10 is forced downward from the upper position of FIG. 6, control member 17 and flange 45 thereon is forced downward. The undersurface 36 of flange 45 is forced against the upper surface 18 of stem member 42, forcing stem member 42 and the entire actuator piston assembly of the sequencing valve attached thereto downward in the same translatory motion ordinarily performed in response to the application of water pressure. When downward pressure on handle 10 is released, spring 70 forces stem 42 and control member 17 upward to the original upper position. The down and up translatory cycle causes the cam follower 90 to follow the cam arrangement on camming member 80 rotating the valve to the next outlet port in the sequence. By means of successive down and upward manual operation of the handle 10, a worker can select an outlet conduit and watering zone for maintenance without applying water pressure. Furthermore, the sequencing valve can be locked with the handle 10 and control member 17 in the lower position of FIGS. 4 and 5 wherein the valve 40 will remain at the selected outlet and will not sequence regardless of the water pressure changes. The down position is locked by rotating the handle 10 so that surface 22 of slot 24 comes in contact with narrow diameter 29 of lock rod 12. This causes upper surface 25 of handle 10 to be trapped by under surface 26 of lock rod 12 and completes the sequence for locking the valve in the selected flowing zone. When the water pressure is turned off the sequencing valve 40 will remain at the selected zone because spring 70 cannot force stem member upward due to flange 45 on control member 17 obstructing its upward movement as upper surface 18 of stem 42 engages under surface 36 of flange 45. Upper surface 20 of flange 45 limits the upward movement of handle 10 when it strikes under surface 21 of cap 15. And O-ring 31 seals the space between control member 17 and cap 15 to prevent water leaks.

Figure 13:
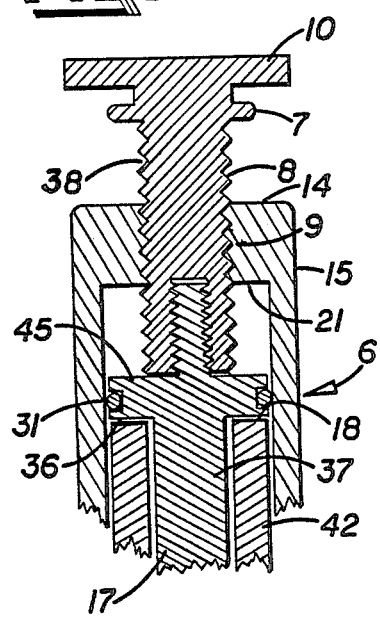
FIG. 13 is a cross sectional view of another embodiment of the invention.
Figure 14:
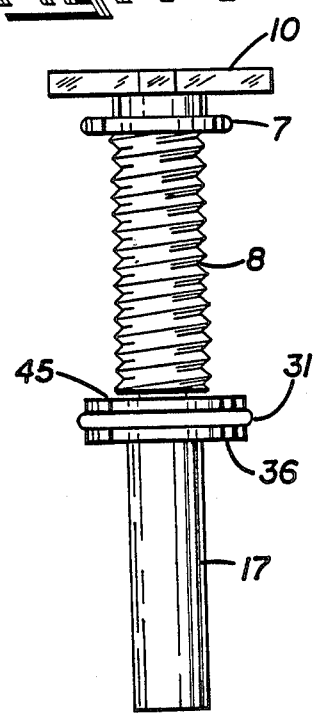
FIG. 14 is a front elevation view of the control member of FIG. 13.

An alternative embodiment of the invention employing a screw thread mechanism is illustrated in FIGS. 13 and 14. The control member 17 has an upper flange 7 to limit the downward movement of the control member in the cap 15, and a threaded portion 8 that threadably engages a matching internal thread 9 on cap 15. The control member 17 is raised and lowered by rotating handle 10. The O-ring 31 is carried by flange 45 to seal control member 17 against the cap 15 and prevent water leaks. The handle 10 is rotated to move control member 17 downward until flange 7 strikes upper surface 14 of cap 15 to lock the sequencing valve in a selected zone. The handle is rotated to move control member 17 upward until flange 45 strikes the under surface 21 of cap 15 to put attachment and sequencing valve in normal operating mode wherein the attachment has no effect on the sequencing valve. To move the sequencing valve to the next outlet manually without water pressure, the handle is screwed down again. The control element 17 may be constructed of a lower portion 37 screwed into an upper portion 38.

In the alternative embodiment illustrated in FIGS. 8–12, the control member 17 comprises a handle 10 affixed to a shaft 46. A cylindrical element 47 axially connected to shaft 46 carries an upper O-ring 48 and lower O-ring 49 to seal water leaks between control member 17 and cap 15. A flat vertical facet 32 is cut into the surface of the cylinder. At the extreme ends of the facet 32 an upper groove 33 and a lower groove 35 are cut circumferentially into the cylinder 47. A horizontal locking pin 39 is secured in two holes 41 in cap 15, forming a chord of the internal circumference of cap 15.

The flat facet 32 and locking pin 39 are arranged so that when the cylinder is rotated until the plane of the facet 32 is parallel to the axis of the pin 39, the control member is free to move up and down between the up position of FIGS. 10 and 12 and the down position of FIG. 9. Travel beyond these positions is limited by the pin 39 impinging upon unfaceted portions of cylinder 47. Pushing the handle 10 up and down between these limits manually sequences the valve 40 to advance to the next outlet conduit. To lock the control member 17 in either the up or down position, the handle is rotated 180° which causes the locking pin 39 to engage either the upper circumferential groove 33 or the lower circumferential groove 35, thereby preventing up and down movement of control member 17.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. In an automatic sprinkling valve of the type having a housing, an inlet and a plurality of outlets in said housing, a movable valve member constructed to sequentially connect the inlet with each of the outlets, a mechanism responsive to sequential increases and decreases in pressure at the inlet for moving said valve member to sequentially connect the inlet with each of said outlets, the improvement comprising:
   (a) manual control means for engaging said mechanism for manually moving said valve to any selected position so that the next pressure increase will connect the inlet to a selected outlet, said manual control means having a first, inactive position in which the operation of said valve is unaffected by said manual control means and said operation of said valve does not affect said manual control means and a second, active position in which the operation of said valve is prevented from sequentially connecting the inlet with each of said outlets and the inlet is connected to a selected outlet and that connection is unchanged by water pressure changes; and
   (b) locking means for selectively locking said manual control means in either said first position or said second position.

2. The improvement according to claim 1 in which said manual control means provides a reciprocating vertical motion, and said first position is an up position and said second position is a down position.

3. The improvement according to claim 1 in which said locking means includes:
   (a) a handle;
   (b) locking rod engaging means connected to said handle;
   (c) locking rod means attached to said valve; and
   (d) handle engaging means connected to said locking rod.

4. The improvement according to claim 2 in which said locking means includes:
   (a) a handle;
   (b) locking rod engaging means connected to said handle;
   (c) locking rod means attached to said valve; and
   (d) handle engaging means connected to said locking rod.

5. The improvement according to claim 1 in which said control means moves between said first position and said second position by screw thread means.

6. The improvement according to claim 2 in which said control means moves between said first position and said second position by screw thread means.

7. The improvement according to claim 1 in which said locking means includes a locking pin means positioned transversely to the direction of motion of said control means and said control means includes a pair of engaging means for engaging said locking pin means at either said first position or said second position by manual selection.

8. The improvement according to claim 1 in which said manual control means moves said valve member from connection of one outlet to connection of another outlet by moving said control means between said first and second positions.

9. The improvement according to claim 2 in which said reciprocating motion moves said valve mechanism from connection of one outlet to connection of another outlet.

10. In an automatic sprinkling valve of the type having a housing, an inlet and a plurality of outlets in said housing, a movable valve member constructed to sequentially connect the inlet with each of the outlets, a mechanism responsive to sequential increases and decreases in pressure at the inlet for moving said valve member to sequentially connect the inlet with each of said outlets, the improvement including an attachment for said valve, the attachment comprising:
    (a) manual control means for engaging said mechanism for manually moving said valve to any selected position so that the next pressure increase will connect the inlet to a selected outlet, said manual control means having a first, inactive position in which the operation of said valve is unaffected by said manual control means and said operation of said valve does not affect said manual control means and a second, active position in which the operation of said valve is prevented from sequentially connecting the inlet with each of said outlets and the inlet is connected to a selected outlet and that connection is unchanged by water pressure changes; and
    (b) locking means for selectively locking said manual control means in either said first position or said second position.

11. The improvement according to claim 10 in which said manual control means provides a reciprocating vertical motion, and said first position is an up position and said second position is a down position.

12. The improvement according to claim 10 in which said locking means includes:
    (a) a handle;
    (b) locking rod engaging means connected to said handle;
    (c) locking rod means attached to said valve; and
    (d) handle engaging means connected to said locking rod.

13. The improvement according to claim 11 in which said locking means includes:
    (a) a handle;
    (b) locking rod engaging means connected to said handle;
    (c) locking rod means attached to said valve; and
    (d) handle engaging means connected to said locking rod.

14. The improvement according to claim 10 in which said control means moves between said first position and said second position by screw thread means.

15. The improvement according to claim 11 in which said control means moves between said first position and said second position by screw thread means.

16. The improvement according to claim 10 in which said locking means includes a locking pin means positioned transversely to the direction of motion of said control means and said control means includes a pair of engaging means for engaging said locking pin means at either said first position or said second position by manual selection.

17. The improvement according to claim 10 in which said manual control means moves said valve member from connection of one outlet to connection of another outlet by moving said control means between said first and second positions.

18. The improvement according to claim 11 in which said reciprocating motion moves said valve mechanism from connection of one outlet to connection of another outlet.

19. The improvement according to claim 11 in which said locking means includes a locking pin means positioned transversely to the direction of motion of said control means and said control means includes a pair of engaging means for engaging said locking pin means at either said first position or said second position by manual selection.

* * * * *